Nov. 22, 1938.   G. H. OSGOOD   2,137,506
MACHINE FOR MAKING LAMINATED PANELS
Filed June 21, 1937   2 Sheets-Sheet 1
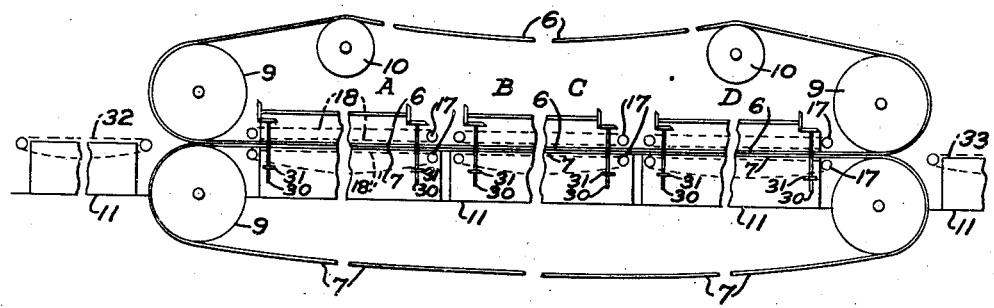
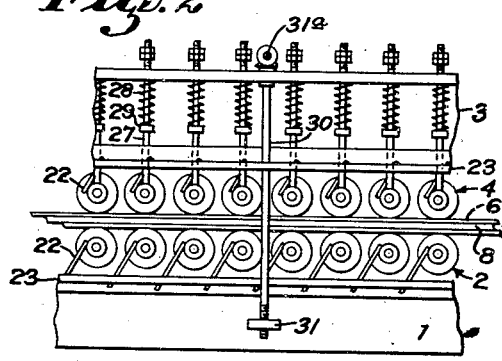
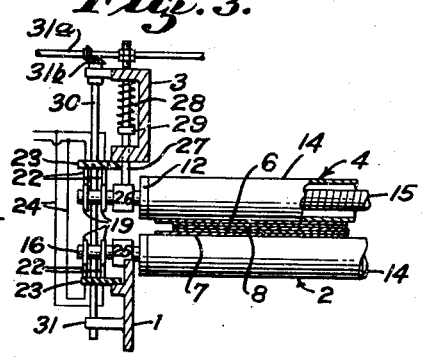
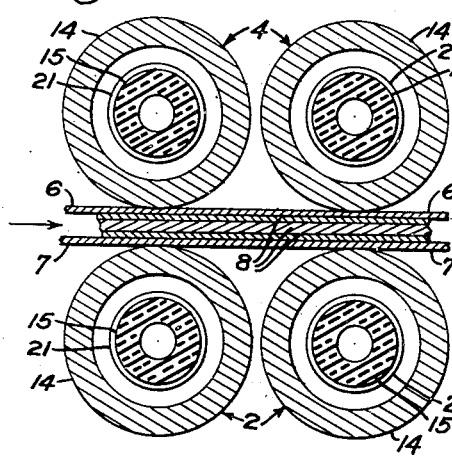
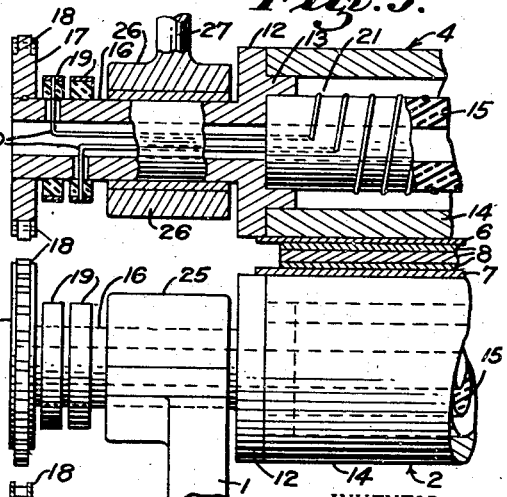
INVENTOR.
George H. Osgood
BY
ATTORNEY.

Nov. 22, 1938.    G. H. OSGOOD    2,137,506
MACHINE FOR MAKING LAMINATED PANELS
Filed June 21, 1937    2 Sheets-Sheet 2

INVENTOR.
George H. Osgood
BY H. B. Moula
ATTORNEY

Patented Nov. 22, 1938

2,137,506

UNITED STATES PATENT OFFICE 2,137,506

MACHINE FOR MAKING LAMINATED PANELS

George H. Osgood, Tacoma, Wash.

Application June 21, 1937, Serial No. 149,280

3 Claims. (Cl. 144—281)

This application is a continuation in part of my application, Ser. No. 18,577, filed April 27, 1935, for Machines for hot-pressing laminated panels.

This invention relates to means for pressing glued plies together with the application of heat thereto, to form a multi-ply panel or board, and it is especially applicable to the production of laminated panels or boards comprising sheets or plies of wood glued together; for making laminated material comprising paper or cardboard glued to like material or to wood; and in fact for making laminated material comprising a layer of any suitable material glued to a layer of porous material, and particularly where there is a tendency for the completed laminated structure to warp or twist due to the presence of, and the quantity, of the liquid vehicle of the glue used. It is an improvement over the inventions set forth in my prior Patent No. 1,706,675, granted March 26, 1929, for "Apparatus for making plywood", and in my applications Ser. Nos. 738,640 and 5,728, filed, respectively, August 6, 1934, and February 9, 1935, for "Continuous veneer panel press" and "Machine for hot-pressing laminated panels", respectively, as well as over other prior means.

An object of my invention is to provide an apparatus for hot-pressing plies of wood with glue between them in order to unify the same into a laminated article in such a manner as to minimize the tendency of the panel to warp or twist thereafter.

Another object of my invention is to provide an apparatus for pressing together, preferably with the application of heat, plies of wood veneer with a glue between them which contains water or other removable liquid as solvent or vehicle which, in the amount thereof present, has too great a tendency to warp or twist the product.

Another object of my invention is to provide an apparatus by which the pressing operation may be speeded up.

A further object of my invention is to provide an apparatus for hot-pressing as above described, according to which the loss of moisture from the various areas of the panel during hot-pressing may be made more uniform than has been possible heretofore.

Another object is to provide means whereby the operations may be performed in a continuous manner; and other objects of my invention will become apparent on reading this specification.

Various kinds of hot-presses have heretofore been proposed. For example, stationary presses with stationary platens can be used, and one or more laminated assemblies may be treated by heating these platens and pressing them together with the laminated assemblies between them; but then the distribution of heat to the inside assemblies is not uniform nor effective if more than one panel lies between the platens, unless separately heated auxiliary platens be inserted between the various panel assemblies. Platens of this type are known as stationary platens (although they are movable) because they do not travel with the work.

Machines having movable platens which travel with the work are described and claimed in my applications above referred to and constitute a part of the present invention. These movable platens are heat-conducting sheets, bands, strips, or plates, endless or otherwise, and they are hereinafter designated "sheets" as a generic term. Between them the panel assemblies are sandwiched, and the whole is passed between heated pressing rolls, the platens and panel assemblies moving as a unit. These platens preferably have a certain degree of flexibility without being too flexible; and if endless, they may return to the feed end of the machine over suitable pulleys, while otherwise they may be returned to the feed end by laying them on top of the upper rolls, the rotation of which will return them to the entrance end of the machine, or otherwise as may be desired.

In the continuous hot-pressing apparatus heretofore proposed there is ventilation only at the edges of the panel assemblies being treated, with the result that there is a comparatively greater loss of moisture at such edges, and by the time the glue has set the moisture content of the panel is unequally distributed and the panel contains less moisture at the edges than at points away therefrom, which means that the edges have shrunk to some extent due to drying, while the center is moister. Drying out of this moisture center later sets up a tendency to shrink at the center only, which sets up in the panel a tendency to warp or twist.

My invention overcomes such objections. The principle thereof is illustrated in the accompanying drawings, in which—

Fig. 1 is a diagrammatic side view of a machine embodying the invention;

Fig. 2 is a side view of a series of rollers which may be used in such a machine;

Fig. 3 is a cross-section of one side of the machine;

Fig. 4 is a section taken longitudinally of part of the machine, illustrating the rollers on an enlarged scale;

Fig. 5 is a partial cross-section of the machine on an enlarged scale;

Figure 7:
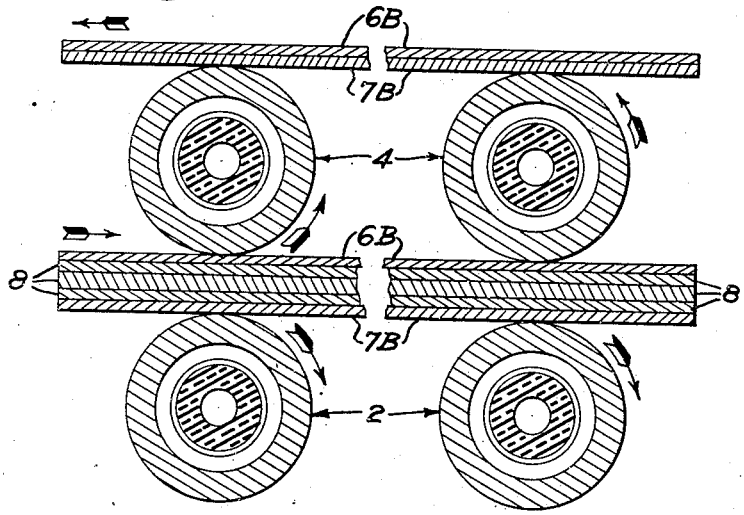
Fig. 7 is a view similar to Fig. 4, illustrating a variation.

The machine is divided into a plurality of sections, "A", "B", "C" and "D", etc., each similar to the others, and each comprising a main frame 1, on which a series of driven lower rolls 2 are mounted, and supporting an adjustable frame 3, on which a similar series of driven upper rolls 4 are resiliently mounted, said upper rolls 4 being pressed downwardly from said adjustable supplemental frame 3 by suitable pressure means, as by springs, and said adjustable frames 3 being each adjustable preferably independently of each other so that the pressure applied to the panel may be increased or decreased from section to section as the panel advances through the machine. The said sections are placed end to end in alinement and a pair of upper and lower thin steel sheets 6 and 7 are run between and in contact with the said rolls 2 and 4, respectively, continuously through the machine, from end to end; and they receive the freshly glued panels 8 between them at one end and discharge the completely made panels at the other end.

These sheets 6 and 7 are preferably but not necessarily made endless, as illustrated, being formed preferably of thin steel, and being carried around suitable pulleys 9 at the ends. The returning portion of the upper sheet 6 is preferably carried away from the machine by suitable pulleys 10 and returning portion of the lower sheet 7 may be carried back under the floor 11. The sheets are sufficiently flexible and yet stiff enough to bend around the pulleys and to produce differences in pressure on the work as it passes through the machine, the pressure being at a maximum between the rollers of a pair and at a minimum between the pairs of rollers, the minimum pressure applied to the work before the glue has set sufficiently, or while the glue is setting, being great enough to prevent separation of the plies sufficiently to break or weaken the glue line. This is important because the strength of a glue line is decreased by breaking it during the setting of the glue, to such an extent that the product may be valueless. The pairs of rolls are preferably mounted as closely together as possible in order to reduce the distance in which said sheets must carry the pressure, and to that end the rolls are preferably made of as small a diameter as is practicable. The sheets are formed of thin steel which is the preferred material so that there is some flexing thereof, and slight differences in pressure exist at and intermediate adjacent pairs of rollers. The minimum pressure should be sufficient to maintain the glue line unbroken and unweakened, as stated above. The pressure differences will be discussed hereinafter.

All the rolls may be of exactly similar construction. Each comprises a head 12 at each end, said heads being formed with an internal annular flange 13, adapted to receive the tubular portion 14 on its outer surface and to carry the insulating cylinder 15 in its inner face. Each head 12 is also provided with a hollow shaft or trunnion 16 extending outward therefrom, on which the driving sprocket wheels 17 are mounted; said sprocket wheels being driven by suitable chains 18 in the usual manner. A pair of collector rings 19 are also mounted on the shaft 16, and electric connections 20 lead therefrom to the ends of the heating coil 21 wound on the outside of the insulating cylinder 15, said heating coil being made of suitable resistance wire, for example nichrome. The electric current is conducted to the respective rings 19 by suitable brushes 22 mounted on suitably supported insulating strips 23, said brushes being connected to the two sides of an energized electric circuit 24. The main portion of each roll is composed of the heavy tube 14 of metal, extending between the two heads 12 and completely enclosing the heating unit composed of the cylinder 15 and the heating wires 21. The cylinder 15 and the strips 23 may conveniently be made of porcelain or other good insulator. The heating wires 21 are close to but do not touch the tube 14.

The lower rolls 2 are supported by the bearings 25 mounted on the main frame 1 of the machine. The upper rolls 4 are mounted on bearings 26 which are hung from and pressed down by the supplemental frame 3, by means of rods 27, slidably mounted in said frame 3, and having compression springs 28 pressing downwardly on shoulders 29 on the rods. The springs 28 may all be of substantially the same strength. The pressure exerted by the springs 28 is controlled by the position of the supplemental frame 3. This frame is adjustably supported from the fixed frame 1 by means of screw rods 30 passing through threaded lugs 31, formed on the frame 1, and rotated therein by suitable shafting 31ᵃ and gears 31ᵇ, whereby each entire supplemental frame is moved equally at all parts. Thus the pressure on the panels as they pass through the machine may be adjusted from end to end thereof, by making suitable adjustments of the successive supplemental frames 3.

The action of such an exemplification may be briefly described as follows: The freshly glued panels are fed continuously from the receiving table 32, between the moving sheets 6 and 7 and thus pass between the heated pressure rolls 2 and 4. The temperature of these rolls is maintained preferably at a temperature above 200° F. and they transfer their heat to the sheets 6 and 7 which, in turn, transmit the heat to the panel at the same time that it is under pressure. The panel glue is thereby converted while being subjected to heat and pressure to a form capable of making the plies adhere to each other. The speed of drying of the glue in the panel will depend on the kind of glue used, the temperature of the rolls, and the conductivity and condition of the wood. The panels are discharged onto the table 33.

The panels are run through the machine after the glue has been applied between the individual plies. They may be dried to a very substantial degree in passing through the machine, that is, during the hot-pressing operation; but I prefer to have the hot-pressing operation merely so affect the glue while the plies are held or pressed together that it will cause the plies to adhere very firmly to each other, the actual drying down to the desired water-content being accomplished after exit of the hot-pressed panels from the machine, although some moisture will of course be lost in the hot-pressing operation.

The pressure exerted on the panels in the machine can be such as to compress the wood and alter the wood fibers or their relative positions; but as a rule I prefer to press the panels only sufficiently to cause the desired firm adherence of the plies to each other without permanently compressing or changing the natural characteristics of the wood fibers.

The sheets 6 and 7 are preferably of steel and need not necessarily be endless, for they may be plates or strips. Whatever their form, they should have a certain degree of rigidity and a certain degree of flexibility, such that they will impart the pressure exerted by the rollers not only directly to the panel parts between the rollers of a pair, but also indirectly to the panel parts in the lateral spaces between the pairs of rollers. The panels may thus be subjected to a continuous but undulating or pulsating pressure as they pass through the machine. The variations in the pressure as the panel moves from point to point in the machine may thus be controlled, as may the degree of pressure at each point.

With the proper degree of flexibility or of rigidity of the sheets, particularly with relation to the spacing between the pairs of rollers, the pressure variations on the panel as it passes through the machine can be controlled at will. There will be an undulating or pulsating pressure which will be at a maximum at points between the rollers of a pair, and this maximum pressure may be adjusted, if desired, at different points of the machine by a suitable setting thereof. The minimum pressure will be at points midway between the pairs of rollers and this may be controlled by a proper choice of distance between pairs of rollers and the degree of flexibility of one or both sheets.

I have discovered that a better effect is obtained if the pressures at the points midway between the pairs of rollers is below, but only slightly below, the pressures between the pairs of rollers; in other words, the pressure curve should be wavy but not permitting breaking of a glue line. Such a pulsating pressure means that as the panel travels through the machine, there will be a periodic decrease and increase of the pressure applied thereto, which kneads the glue into the open pores of the wood as such glue is being converted by the applied heat, so that when the glue has set, the panel is very much stronger than one produced by the same glue under the same operating conditions without the pulsation or undulation of the pressure.

The machine so far described is referred to in my above-mentioned prior applications Ser. Nos. 738,640 and 5,728. While I may prefer certain improvements as referred to in the latter of said applications, the machine herein described is sufficient to illustrate the principle of my present invention.

The present improvement comprises providing suitable perforations in the sheets, which I have found result in greater efficiency of the machine and in a better product. I prefer that the perforations if circular have a diameter not larger than $\frac{3}{16}$ of an inch, since larger perforations have a tendency to cause indentations in the outside face of the wood panel, this effect being greater on thinner sheets than on thicker ones. As a matter of practice and to include a factor of safety, I make the holes, if round, of a diameter of $\frac{5}{64}$ of an inch. I have found that $\frac{1}{8}$-inch diameter holes may be effectively located at the corners of squares having 3-inch sides with a hole at the center of each square, and that the $\frac{5}{64}$-inch diameter holes may be effectively located at the corners of squares having 1½-inch sides, with a hole at the center of each square. It is of course understood that the perforations or holes need not necessarily be circular, but may be in the form of long narrow slots which may run crosswise or lengthwise of the grain of the wood which they contact, or such perforations may have any other suitable shape.

As described in my application Ser. No. 5,728 previously referred to, the pressure may be fluid pressure, that is, the pressure on the rolls is exerted by a fluid. Fluid pressure is more easily controlled than ordinary spring pressure, and pneumatic pressure is uniform no matter how the stock to be veneered varies in thickness.

The perforations in the bands or strips permit the escape of moisture, and it is observed that this moisture escapes in puffs through the perforations and at the edges, due to this undulating pressure.

Figure 6:
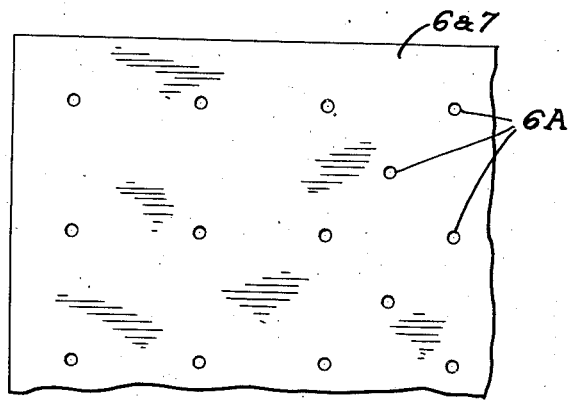
Fig. 6 is a plan view of the sheet.

In Fig. 6 I show the sheets 6, 7 having perforations 6A therein.

In Fig. 7, instead of endless bands I show plates 6B and 7B, between which the panel assembly passes through the machine, say from left to right. After emerging from the machine the panel is removed from between the plates 6B and 7B, and such plates may then be placed on the upper rollers at the right hand end of the machine, said rollers carrying the plates back to the left hand end of the machine where new panel assemblies may be placed between them for passage through the machine.

My machine and method are useful with various types of glues of animal, vegetable, or mineral origin, including the seed flour glues, glues of the water glass type, and starch glues, particularly unconverted-starch glues, as well as others. They are particularly adapted to use with the unconverted-starch glues, such, for example, as those of the Abramowitsch Patent Number 1,788,608 of January 13, 1931, and of the application filed by Russell G. Peterson and myself November 26, 1934, Ser. No. 754,834, as well as other glues.

While I have described various details, yet it is to be understood that my invention is not necessarily limited thereto, since changes may be made within the spirit of the invention. Although the appended claims refer to the treatment of wood, I intend them to cover the treatment of analogous materials as well.

I claim:

1. A machine for the gluing of wood, comprising a series of spaced means for exerting pressure on the wood to be glued, a thin metal sheet between said first mentioned means and the wood and adapted to transmit this pressure in varying amounts to all parts of the wood, the stiffness of said metal sheet being such that it will vary the pressure transmitted by it to the wood from a maximum pressure at the spaced means to a minimum pressure intermediate said means to cause the glue to be kneaded into the wood, the minimum of said varied amounts of pressure exerted on the wood by said thin metal sheet being sufficient to maintain an unbroken glue line, means for moving said thin metal sheet relative to said first mentioned means, and means for supporting the wood in contact with the said thin metal sheet, said aforementioned thin metal sheet being provided with perforations to permit the surface of the wood to vent moisture during the periods of maximum pressure.

2. A machine for the gluing of wood, comprising a first series of spaced rollers for exerting pressure on the wood to be glued, a thin metal sheet between said first series of rollers and the wood, a second series of spaced rollers for exerting pressure on the wood in opposed direction to the first set of spaced rollers, a second thin metal sheet between said second series of spaced rollers and the wood, said thin metal sheets being spaced from one another so as to permit of the passage between said series of rollers of the said wood between them and in contact therewith, both metal sheets being adapted to transmit the pressure from their respective rollers in varying amounts to all parts of the wood, and the stiffness of the said metal sheets being such that they vary the pressure transmitted by them to the wood from a maximum pressure at the spaced rollers to a minimum pressure intermediate said rollers to cause the glue to be kneaded into the wood, and the minimum of said varied amounts of pressure exerted on the wood being sufficient to maintain an unbroken glue line, and means for moving the thin metal sheets with respect to the rollers, said aforementioned thin metal sheets being provided with perforations to permit the surface of the wood to vent moisture during the periods of maximum pressure.

3. A machine for the gluing of wood, comprising a series of spaced means for exerting pressure on the wood to be glued, flexible means between said first mentioned means and the wood to transmit said pressure in constantly varying amounts to all parts of the wood, the stiffness of said second mentioned means being such that it will constantly vary the pressure transmitted by it to the wood from a maximum pressure at the spaced means to a minimum pressure intermediate said means to cause the glue to be kneaded into the wood, the minimum of sa'd varying amounts of pressure exerted on the wood being sufficient to maintain an unbroken glue line, means for moving one of said means with respect to said other means, and means for supporting the wood in contact with said flexible means, said aforementioned flexible means being provided with means to permit the surface of the wood to vent moisture during periods of maximum pressure.

GEORGE H. OSGOOD.